UNITED STATES PATENT OFFICE.

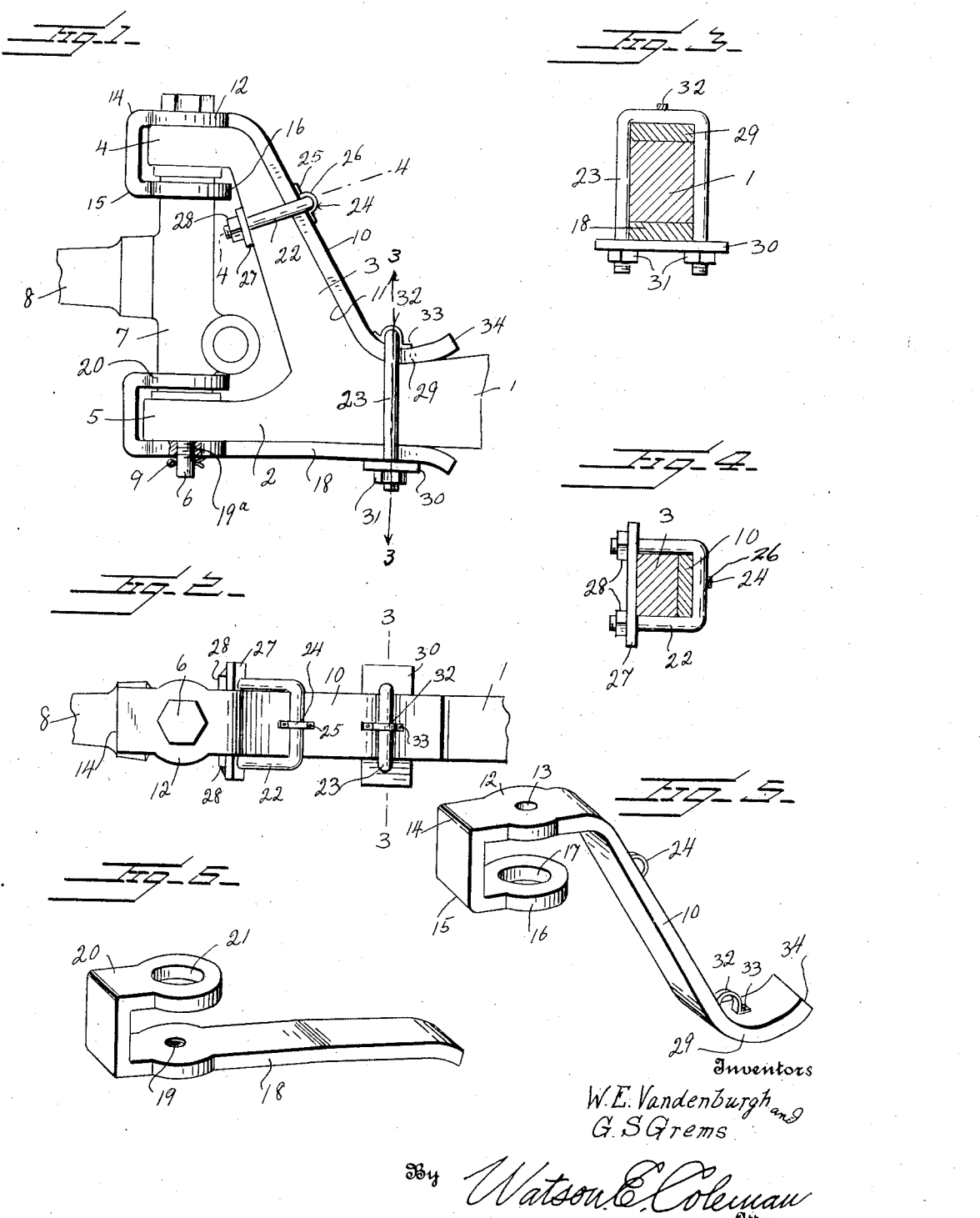

WARREN E. VANDENBURGH AND GLEN S. GREMS, OF MILFORD, IOWA.

REINFORCEMENT FOR WHEEL KNUCKLE-JOINTS.

1,344,192.   Specification of Letters Patent.   Patented June 22, 1920.

Application filed April 2, 1919. Serial No. 286,851.

*To all whom it may concern:*

Be it known that we, WARREN E. VANDENBURGH and GLEN S. GREMS, citizens of the United States, residing at Milford, in the county of Dickinson and State of Iowa, have invented certain new and useful Improvements in Reinforcements for Wheel Knuckle-Joints, of which the following is a specification, reference being had to the accompanying drawings.

This invention relates to an improved reinforcement or brace, particularly adapted for reinforcing or bracing the various parts of a knuckle or swivel joint between the front axle and the spindle, particularly the spindle bolt between the forks and the stub axle, and also for bracing the forks.

The invention particularly aims to so reinforce the forks at the end of the axle, as to strengthen them, whereby they may resist and withstand various strains on the forks incident to the swinging movement of the spindle, and incident to the up and down vibration on the spindle created by the wheel riding over the rough road beds.

The front wheels in passing over rough road beds are vibrated vertically, which exerts various lateral strains on the forks, not only in a direction vertically in alinement with the forks, but vertically and laterally to the forks, that is particularly when the front wheels are turned. Therefore, it is the aim of the present invention to provide reinforcing or bracing means to offset or resist these various strains, and thereby prolong the life of the forks of the knuckle or swivel joint.

While the design and construction at present illustrated and set forth is deemed preferable, it is obvious that as a result of the invention being reduced to a more practical form for commercial purposes, the invention may be susceptible to changes and the right to these changes is claimed, provided they are comprehended within the scope of what is claimed.

The invention comprises further features and combination of parts, as will be hereinafter set forth, shown in the drawings and claimed.

In the drawings:

Figure 1 is a view in front elevation of a portion of a front axle of an automobile, illustrating the conventional form of knuckle or swivel joint between the axle and the spindle for the front wheel, and showing the improved reinforcements or braces as applied to the forks of the axle.

Fig. 2 is a plan view of the same.

Fig. 3 is a sectional view on line 3—3 of Fig. 2.

Fig. 4 is a sectional view on line 4—4 of Fig. 1.

Fig. 5 is a detail perspective view of one of the braces or reinforcements.

Fig. 6 is a detail perspective view of the other reinforcement or brace.

Referring more especially to the drawings 1 designates a portion of a conventional form of axle, which is provided with the usual forks 2 and 3. The fork 3 inclines upwardly and laterally and terminates in an end part 4 which is in parallelism and spaced in super-imposed parallel relation to the horizontal portion 5 of the fork 2. A bolt 6 passes through the spaced parallel parts 4 and 5, and through the vertical sleeve 7, which extends at right angles to the spindle 8 for the wheel. A cotter pin 9 passes transversely through its lower end, to secure the bolt in place.

A brace or reinforcement 10 is provided, and is shaped to conform to the arm or fork 3. The major part of this brace or reinforcement engages the face 11 of the arm or fork, and its upper portion 12 overlies the upper face of the upper parallel part 4. The portion 12 of the brace has an opening 13, through which the bolt 6 passes. Where the opening 13 is formed in the portion 12, said portion is enlarged. Laterally beyond the portion 4, the portion 12 is bent at 14 and 15, to overlie the end part of the portion 4, and to provide an extension 16, which is disposed under the portion 4. This extension 16 has an opening 17, which is of sufficient diameter to receive the upper end of the sleeve 7. Where the opening 17 is formed, the extension 16 is constructed wide enough to insure strength and rigidity, and to reinforce the sleeve 7 relatively to the portion 4 of the arm or fork 3.

A second brace or reinforcement 18 is provided and is arranged against the underface of the axle 1 and under the arm or fork 2. This brace has an opening or aperture 19 for the reception of the lower end of the bolt 6, the cotter pin 9 engaging through the bolt, at a point immediately below the brace or reinforcement 18. The brace 18 is enlarged where the opening 19 is formed, so as to insure rigidity. The brace 18 has an extension 20, which is bent upwardly and inwardly to provide the angular part which overlies the end and the upper face of the fork or arm 2. The end part of the extension 20 has an opening 21 for the reception of the lower end of the sleeve 7 of the spindle, and where the opening 21 is formed, the extension 20 is constructed of suitable width to also insure strength and rigidity.

Staple-shaped members 22 and 23 are provided. The staple member 22 straddles the reinforcement 10 and the arm or fork 3, there being a retaining element 24 fastened to the reinforcement or brace as at 25 and it has an arch 26 to overlie the arch of the staple, so as to retain the staple detachably connected to the reinforcement or brace, allowing it to move to various positions. The legs of the staple 22 pass through a plate 27 which is disposed adjacent the arm or fork 3, there being nuts 28 threaded upon the legs of the staple, so as to draw and clamp the adjoining parts securely together. The staple 23 straddles the bent end 29 of the brace or reinforcement 10 and also the end portion of the axle. The legs of the staple 23 penetrate a plate 30, there being nuts 31 threaded upon the lower ends of the legs and by turning the nuts home, the adjoining parts (which are straddled by the staple 23) may be drawn or clamped securely together. A retainer 32 is secured at 33 to the lateral end of the reinforcement or brace 10. This retainer arches the arched portion of the staple 23, and acts to retain the staple 23 in position, whereby it may be adjusted to any position. The extremities 34 of the braces or reinforcements are upwardly and downwardly bent or deflected as shown, so that when tightening up on the staple 23 these bent portions may be depressed.

Heretofore when the pivot bolt connecting the knuckle hub and the forks of the front wheel of an automobile becomes worn or weakened, and wears out and finally breaks, the vertical sleeve of the knuckle hub will become detached from between the forks, in which case the front wheel is disconnected, and then the axle will drop to the ground. Many accidents occur owing to this breakage of the bolt, and the general object of this invention is to avoid these difficulties, and to so reinforce the brace or bolt, and also the sleeve of the stub shaft, so that should the bolt become broken, the sleeve will remain connected between the forks of the axle, enabling the stub axle and the front supporting wheel to function just the same as if the bolt had not become broken. The opening 19 in the lower part of the brace 18 is threaded, and the lower end of the bolt 6 has threads 19$^a$, to engage the threads of the openings 19. It is obvious, that should the bolt become broken, the brace or reinforcement will hold the sleeves of the stub axle swivelly, and owing to the lower end of the bolt being threaded in the opening 19, the bolt will remain in place, and in this way the front wheel of the automobile is prevented from disconnecting from the axle, consequently avoiding accidents.

The invention having been set forth, what is claimed as new and useful is:

1. The combination with a knuckle or swivel joint including super-imposed axle forks and wheel engaging spindle and sleeves at right angles to the spindle engaging between the forks, of a pair of reinforcing plates, conforming to the forks and engaging their upper and lower remote faces and having portions bent to underlie and overlie the extremities of the forks, and having means receiving the opposite ends of the sleeve, means passing through the extended parts of the reinforcing plates and through the sleeve for assisting in holding the plates in position, and means for fastening the plates to the axle.

2. The combination with a knuckle or swivel joint including axle forks one superimposed with relation to the other, and a wheel engaging spindle and sleeve at right angles thereto and engaging vertically between the forks, of reinforcement plates engaging the upper and lower remote faces of the forks, means for securing one of the plates to the upper fork, means for securing the plates to the axle, said plates having means overlying the ends of the forks and engaging the sleeve of the spindle.

3. The combination with a knuckle or swivel joint including axle forks, a wheel engaging spindle, and a sleeve at right angles thereto engaging between the forks vertically, means passing through the forks and the sleeve whereby the spindle is swivelly mounted, of reinforcement plates engaging the upper and lower remote faces of the forks, the upper reinforcement plate having a bent end overlying and under-engaging the end of one of the forks, the overlying part of the upper plate receiving the means which pass through the sleeve, the under-lying portion of the plate receiving the upper end of the sleeve, means for securing the upper plate detachably to the upper fork, the other plate having an extension bent U-shaped to overlie the lower fork and having means to receive the lower end of the sleeve, and means for detachably connecting the adjacent ends of the plates to the axle.

4. The combination with a knuckle or swivel joint including axle forks, a wheel engaging spindle, and a sleeve at right angles thereto engaging between the forks vertically, means passing through the forks and the sleeve whereby the spindle is swivelly mounted, of reinforcement plates engaging the upper and lower remote faces of the forks, the upper reinforcement plate having a bent end overlying and under-engaging the end of one of the forks, the overlying part of the upper plate receiving the means which pass through the sleeve, the under-lying portion of the plate receiving the upper end of the sleeve, means for securing the upper plate detachably to the upper fork, the other plate having an extension bent U-shaped to overlie the lower fork and having means to receive the lower end of the sleeve, a staple straddling the adjacent ends of the plates and the axle and having means to secure the staple in place, and a retainer for detachably carrying the staple on one of the plates.

5. The combination with a knuckle or swivel joint including axle forks and a wheel engaging spindle and a sleeve at right angles thereto engaging between the forks, means for reinforcing and bracing the forks, and having an extension to reinforce the sleeve with relation to the forks, and detachable means for fastening said bracing means to the axle.

In testimony whereof we hereunto affix our signatures in the presence of two witnesses.

WARREN E. VANDENBURGH.
GLEN S. GREMS.

Witnesses:
M. M. SIEGERT,
L. B. MILTS.